Oct. 18, 1966  W. L. CALVERT  3,280,238
METHOD OF FORMING AND ATTACHING PLASTIC STRUCTURES
Filed Aug. 25, 1964

INVENTOR.
WILLIAM L. CALVERT
BY
ATTORNEY

United States Patent Office 3,280,238
Patented Oct. 18, 1966

3,280,238
METHOD OF FORMING AND ATTACHING PLASTIC STRUCTURES
William L. Calvert, Westfield, N.J., assignor to Union Carbide Corporation, a corporation of New York
Filed Aug. 25, 1964, Ser. No. 391,978
4 Claims. (Cl. 264—163)

This invention relates to a method of forming and attaching plastic structures and more particularly to a method of simultaneously forming and attaching a plastic structure integral with film.

Heretofore, spouted film bags for packaging milk and other flowable materials have been produced in a number of ways. But because the packager and the consumer demand a bag which is of low-cost, is attractive and durable, efforts have been made and continue to be made to effect a method capable of providing such a bag. Present day methods involve forming the spout in one operation and at one work station and then attaching it to a film portion in another operation and at a second work station. Commonly used methods of attachment include heat sealing, adhesives, and mechanical clamping. Supplementary operations for spout placement and film piercing are also required. Such multiple steps necessitate added equipment, extra time, and therefore more expense. Consequently, a spouted bag of lowest cost, for example, is not generally realized.

Accordingly, it is an object of this invention to provide an efficient and economical method for forming and attaching plastic structures, particularly spouts, to film.

The present invention provides a simple method of forming a plastic structure integral with thermoplastic film. In accordance with the method, a sheet of film is annularly and rigidly supported. A heated plastic mass is introduced proximate an annularly, rigidly supported portion of the film and then is allowed to pierce the film in the zone formed by the annular support. Finally, the heated plastic mass is displaced proximate the pierced portion of the film thereby simultaneously forming and fusing a plastic structure to the film.

Figure 1:
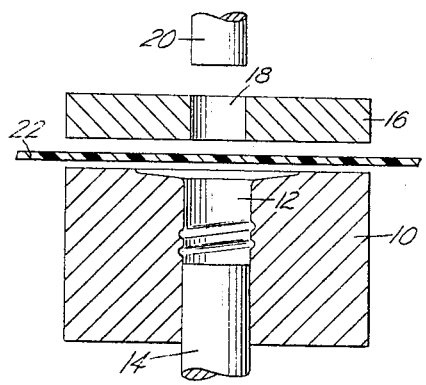
Figure 2:
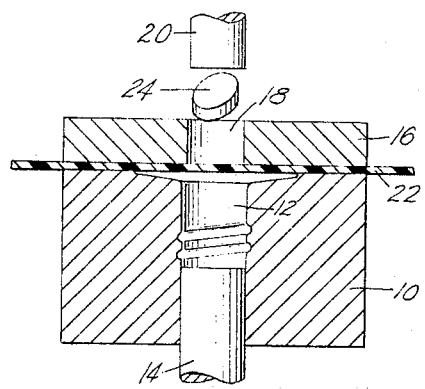
Figure 3:
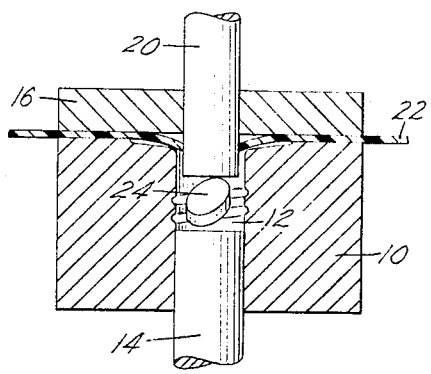
Figure 4:
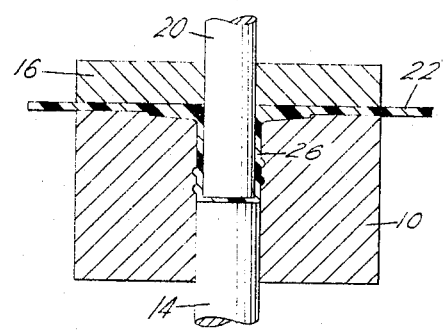
Figure 5:
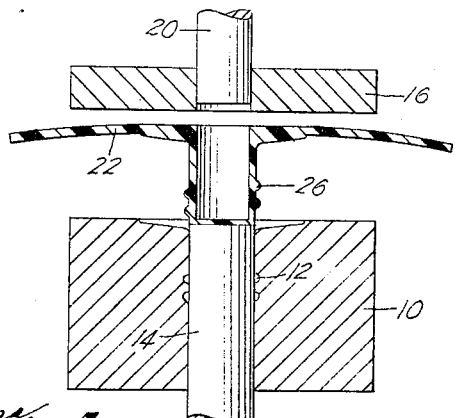

While the aforementioned method may be carried out in various conventional melt compression molding equipment, it is preferred in the process of this invention to use an apparatus as shown in the accompanying drawing in which:

In the drawing:
FIG. 1 is a vertical section of a preferred apparatus for carrying out the process of the invention showing the initial step of the process.
FIG. 2 is a similar view of the apparatus of FIG. 1 showing a second step of the process.
FIG. 3 is a similar view of the apparatus of FIG. 1 showing a third step of the process.
FIG. 4 is a similar view of the apparatus of FIG. 1 showing a fourth step of the process.
FIG. 5 is a similar view of the apparatus of FIG. 1 showing a final step of the process.

Referring now to the drawing as shown in FIG. 1, the preferred apparatus for carrying out the process of the invention includes a lower member 10 having a cavity 12 therein. A movable lower ram 14 is mounted in the cavity 12. The apparatus further includes an upper clamping member 16 which is movably mounted and has a bore 18 disposed opposite to the cavity 12 of the lower member 10. An upper ram 20 is reciprocatably mounted in the bore 18 of the upper member 16.

In the process of the invention, a sheet of film 22, as shown in FIG. 1, is annularly supported by the lower member 10. Thereupon, the upper member 16 descends (FIG. 2) and clamps the film 22 rigidly against the lower member 10. At the same time, a heated plastic mass 24 is introduced through the bore 18 of the upper member 16.

As shown in FIG. 3 the heated plastic mass 24 pierces the film 22 and passes into the cavity 12 formed by the lower member 10 and the lower ram 14. Then the upper ram 20 descends into the cavity 12 displacing the heated plastic mass 24 so as to cause a portion to flow toward and into contact with the film 22 thereby simultaneously forming and fusing a plastic structure 26 such as a closed end tube as shown to the film 22 (FIG. 4).

In FIG. 5, the lower ram 14, the upper member 16, and the upper ram 20 ascends, thereby ejecting the formed plastic structure 26 from the cavity 12 and the process is then repeated.

An important advantage of this invention over known methods is that the heat generated by the heated plastic mass is sufficient to enable the plastic mass to pierce the film thereby making its own hole, be formed into a plastic structure, and finally be fused to the film. Thus formation and attachment of the plastic structure are accomplished at one work station and in one, simultaneous motion; therefore cycle time is at a minimum. Furthermore, such added equipment as hole cutting devices and sealing elements are eliminated. Consequently, the cost of the total operation is greatly reduced.

If desired, the upper ram 20 may be timed to force the plastic mass through the film without allowing sufficient time for the mass to melt its own way through.

The proposed process may be employed for forming any thermoplastic structure and fusing the same to any mutually compatible thermoplastic film. While polyethylene is a preferred material, similarly, other polyolefins including polyethylene copolymers, polypropylene, copolymers of ethylene and propylene, and mixtures of such polyolefins may be used, also.

The cavity 12 of the lower member 10 may vary both in size and shape, its choice depending on requirements. Although the above mentioned apparatus is a preferred embodiment, any comparable melt compression molding equipment would suffice.

While it is desirable to use the aforementioned process for forming and fusing thermoplastic spouts to film, the process is suitable for forming and fusing a variety of plastic structures for application in toys, housewares, automobile and boat accessories, and the like.

What is claimed is:
1. Method of forming a plastic structure integral with thermoplastic film which comprises:
    (a) supporting a sheet of film over a mold cavity;
    (b) introducing a heated plastic mass proximate an annularly, rigidly supported portion of said film;
    (c) allowing said heated plastic mass to pierce said film in the zone formed by said annular support and enter the mold cavity upon piercing the film; and
    (d) displacing said heated plastic mass proximate the pierced portion of said film and up along the side walls of the cavity thereby simultaneously forming and fusing a plastic structure to said film.
2. Method as defined by claim 1 in which the temperature of said heated plastic mass is such so as to cause said molten plastic mass to pierce said film and fuse thereto upon being formed into said plastic structure.
3. Method as defined by claim 2 in which said heated plastic mass and said thermoplastic film are polyethylene polymeric material.
4. Method of forming a thermoplastic spout integral with thermoplastic film comprising:
    (a) supporting a sheet of thermoplastic film over a mold cavity;
    (b) depositing a heated thermoplastic mass proximate an annularly, rigidly supported portion of said film;
(c) allowing said heated thermoplastic mass to pierce said film in the zone formed by said annular support and enter the mold cavity upon piercing the film; and
(d) displacing said heated thermoplastic mass proximate the pierced portion of said film and up along the side walls of the cavity thereby simultaneously forming and fusing a thermoplastic spout to said film.

References Cited by the Examiner

UNITED STATES PATENTS

| | | |
|---|---|---|
| Re. 25,313 | 1/1963 | Walker. |
| 1,754,496 | 2/1928 | Barker. |

ROBERT F. WHITE, *Primary Examiner.*

T. J. CARVIS, *Assistant Examiner.*